W. P. SHANK.
Brush-Holder.
No. 163,536.
Patented May 18, 1875.
FIG I
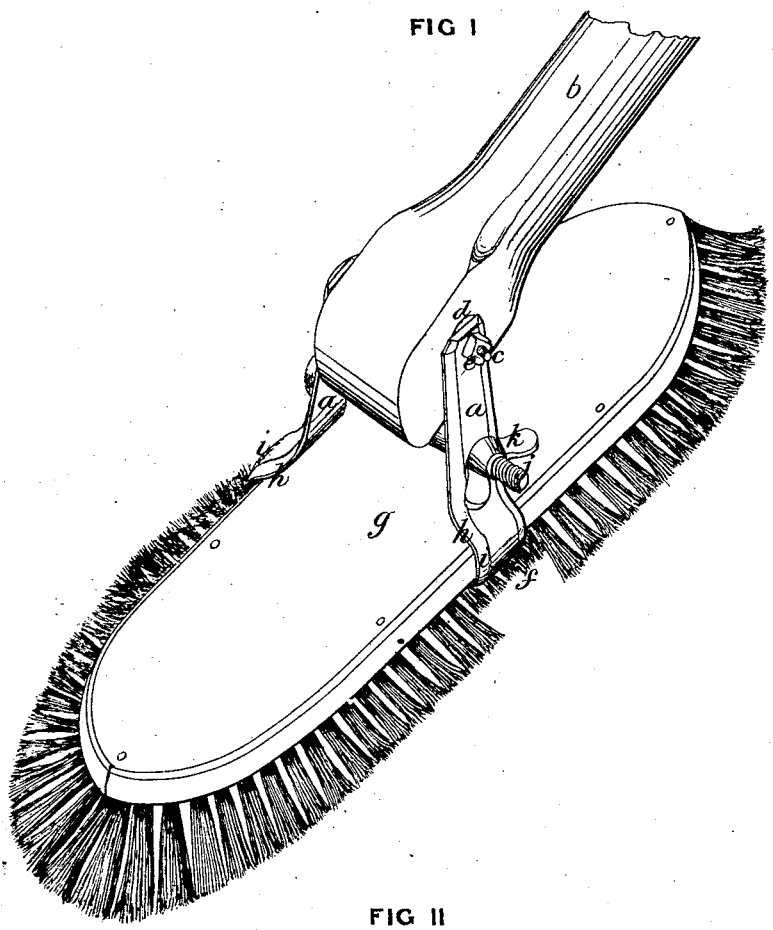
FIG II
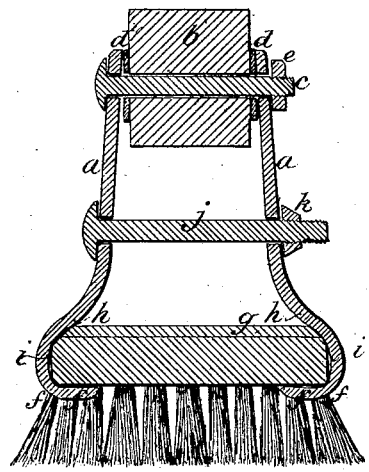
WITNESSES
John E. Laing
J. H. Rutherford
INVENTOR
William P. Shank
by his Att'ys
Johnson and Johnson

UNITED STATES PATENT OFFICE.

WILLIAM P. SHANK, OF CLIFTON, WEST VIRGINIA.

IMPROVEMENT IN BRUSH-HOLDERS.

Specification forming part of Letters Patent No. 163,536, dated May 18, 1875; application filed November 7, 1874.

*To all whom it may concern:*

Be it known that I, WILLIAM P. SHANK, of Clifton, in the county of Mason and State of West Virginia, have invented certain new and useful Improvements in Scrubbing-Brush Holders; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The improvement herein claimed consists of an adjustable clamping device, which holds the brush rigidly by means of hook-shaped arms and a clamping screw-bolt, with the handle-pivot at the upper ends of said arms, whereby the brush is rigidly clamped between the curved ends of said arms, and the latter held firmly in their vertical positions by their curved ends, which afford three grasping and bearing points on each side of the brush-top, whereby it may be easily and quickly applied to different-sized brush-tops, as the arms are held in grasping positions upon the long handle by the same bolt by which their curved ends are clamped to the brush-top.

In the accompanying drawings, Figure 1 represents a view in perspective of a brush-holder embracing my invention, and Fig. 2 a transverse section of the same.

The arms $a$ are of wrought-iron, about one inch wide and three-sixteenths of an inch thick, and the long handle $b$ is secured between their ends by a screw-bolt, $c$, with side bearing-washers $d\ d$, so as to turn freely upon said bolt, and fastened by a screw-nut, $e$. The lower ends of these arms are curved outward, so as to form under horizontal lips $f$, and the bend is of such form as to fit the edges of the top $g$ of the brush with upper bearing sides $h$ and edge bearings $i$, which, with the under lips $f$, give three bearing-points to each arm upon the brush-top. These arms, when applied to the brush, stand up about three inches at right angles to the top, and within the space between the handle and the top I apply a clamp-bolt, $j$, horizontally between them, with a thumb-nut, $k$, on its outer screw end, by which the curved jaw ends are brought firmly against the edges of the top, and hold the brush, so that it will always keep a horizontal position. The pivoted connection of the arms with the handle is such as to allow them to be opened sufficient to easily apply them, and to suit different-sized brush-tops, and the curved jaw ends are kept in line by the same bolt which clamps and unclamps them. The holder, when applied, makes a very firm connection with the brush, and it can be applied and removed in a moment. The washer-bearings prevent the handle from being worn out, and the device is strong and durable, and adapted for use with the hand-brush.

I claim—

The adjustable clamping device, which holds the brush rigidly, consisting of the hook-shaped arms $a$, clamping-bolt $j$, and the pivot-bolt $c$ for the handle, substantially as herein set forth.

In testimony that I claim the foregoing as my own I have affixed my signature in presence of two witnesses.

WILLIAM P. SHANK.

Witnesses:
E. D. SHANK,
W. N. PATMON.